(12) United States Patent
Matsuyama et al.

(10) Patent No.: US 10,483,890 B2
(45) Date of Patent: Nov. 19, 2019

(54) ENGINE GENERATOR COMPRISING AN ELECTRICAL LOAD-DEPENDENT DELTA TO WYE SWITCHING UNIT

(71) Applicant: Honda Motor Co., Ltd., Tokyo (JP)

(72) Inventors: Wataru Matsuyama, Wako (JP); Kenji Shibata, Wako (JP); Tetsuya Matsuhisa, Wako (JP); Minoru Maedako, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 36 days.

(21) Appl. No.: 15/934,718

(22) Filed: Mar. 23, 2018

(65) Prior Publication Data

US 2018/0283294 A1 Oct. 4, 2018

(30) Foreign Application Priority Data

Mar. 30, 2017 (JP) ................. 2017-066546

(51) Int. Cl.
*H02P 9/00* (2006.01)
*H02P 9/04* (2006.01)
(Continued)

(52) U.S. Cl.
CPC ............... *H02P 9/04* (2013.01); *B60W 10/06* (2013.01); *B60W 10/08* (2013.01); *F02D 29/06* (2013.01);
(Continued)

(58) Field of Classification Search
CPC ..... B60W 10/06; B60W 10/08; F02B 63/048; F02D 2250/24; F02D 29/06; F02D 31/001; F02D 31/009; F02D 41/021; F03G 7/08; H02P 1/32; H02P 25/184; H02P 9/04; H02P 9/48; F02N 11/04; F02N 11/087; F02N 2011/0874; F02N 2011/0885;
(Continued)

(56) References Cited

U.S. PATENT DOCUMENTS 6,894,455 B2 *  5/2005  Cai .................. F02N 11/04
                                          318/771
7,352,076 B1 *  4/2008  Gabrys ............... F03D 3/005
                                          290/44
(Continued)

FOREIGN PATENT DOCUMENTS

JP       2007325385 A    12/2007

*Primary Examiner* — Tulsidas C Patel
*Assistant Examiner* — S. Mikailoff
(74) *Attorney, Agent, or Firm* — Duft & Bornsen, PC

(57) ABSTRACT

An engine generator, including a general purpose engine, an engine speed of the engine being variably controlled, a generator unit having a three-phase winding and driven by the engine to generate power, an inverter unit converting AC output from the generator unit to AC of a predetermined frequency to output to a load, a connection switching unit switching a connection configuration of the winding to one of a wye-connection and a delta-connection, a load detection unit detecting a size of the load, and a connection switching control unit controlling the connection switching unit to switch the connection configuration to the wye-connection when the size of the load is equal to or lower than a predetermined value, and to switch the connection configuration to the delta-connection when the size of the load is higher than the predetermined value.

7 Claims, 5 Drawing Sheets

(51) Int. Cl.
   *F02D 29/06* (2006.01)
   *F03G 7/08* (2006.01)
   *B60W 10/08* (2006.01)
   *F02D 31/00* (2006.01)
   *B60W 10/06* (2006.01)
   *F02B 63/04* (2006.01)

(52) U.S. Cl.
   CPC ............ *F02D 31/009* (2013.01); *F03G 7/08* (2013.01); *F02B 63/048* (2013.01); *F02D 2250/24* (2013.01)

(58) Field of Classification Search
   CPC ....... F02N 2011/0896; F02N 2200/022; F02N 2200/042; F02N 2300/104
   See application file for complete search history.

(56) References Cited

U.S. PATENT DOCUMENTS

| | | | |
|---|---|---|---|
| 7,635,039 B2* | 12/2009 | Fujiwara | B60K 6/26 180/65.21 |
| 10,084,404 B2* | 9/2018 | McDonald | H02K 21/024 |
| 2004/0066177 A1* | 4/2004 | Gupta | F01D 15/10 322/10 |
| 2004/0090211 A1* | 5/2004 | Gupta | F01D 15/10 322/10 |
| 2004/0217723 A1* | 11/2004 | Cai | F02N 11/04 318/268 |
| 2017/0267092 A1* | 9/2017 | Thackwell | B60L 50/51 |
| 2018/0283294 A1* | 10/2018 | Matsuyama | H02P 25/184 |
| 2018/0283340 A1* | 10/2018 | Matsuyama | F02N 11/04 |
| 2019/0131912 A1* | 5/2019 | Turevsky | G01R 31/34 |

* cited by examiner

ENGINE GENERATOR COMPRISING AN ELECTRICAL LOAD-DEPENDENT DELTA TO WYE SWITCHING UNIT

CROSS-REFERENCE TO RELATED APPLICATION

This application is based upon and claims the benefit of priority from Japanese Patent Application No. 2017-066546 filed on Mar. 30, 2017, the content of which is incorporated herein by reference.

BACKGROUND OF THE INVENTION

Field of the Invention

This invention relates to an engine generator which is driven by an engine.

Description of the Related Art

Among engine generators of this type are known ones adapted to respond to load current fluctuation by increasing/decreasing engine speed within a predetermined allowable range. For example, Japanese Unexamined Patent Publication No. 2007-325385 (JP2007-325385A) describes a generator that is provided with an economy switch for selecting one or the other of normal operating mode and economical operating mode, controls engine speed to a predetermined desired engine speed when normal operating mode is selected, and controls engine speed to desired engine speed matched to load current when economical operating mode is selected.

However, in a generator whose engine speed is variably controlled as taught by JP2007-325385A, when the winding specifications are set to obtain adequate output at high engine speed, the load cannot obtain adequate output at low engine speed, and when, to the contrary, the winding specifications are set to obtain adequate output at low engine speed, a risk arises of the load not being able to obtain adequate output at high engine speed because power output decreases after once peaking.

SUMMARY OF THE INVENTION

An aspect of the present invention is an engine generator, including: a general purpose engine, an engine speed of the engine being configured to be variably controlled; a generator unit having a three-phase winding and configured to be driven by the engine to generate power; an inverter unit configured to convert alternating current output from the generator unit to alternating current of a predetermined frequency to output to a load; a connection switching unit configured to switch a connection configuration of the winding to one of a wye-connection and a delta-connection; a load detection unit configured to detect a size of the load; and a connection switching control unit configured to control the connection switching unit to switch the connection configuration to the wye-connection when the size of the load detected by the load detection unit is equal to or lower than a predetermined value, and to switch the connection configuration to the delta-connection when the size of the load detected by the load detection unit is higher than the predetermined value.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention is explained with reference to FIGS. 1 to 5 in the following. An engine generator according to the embodiment of the present invention is a portable or mobile generator of weight and size a user can carry by hand.

Figure 1:
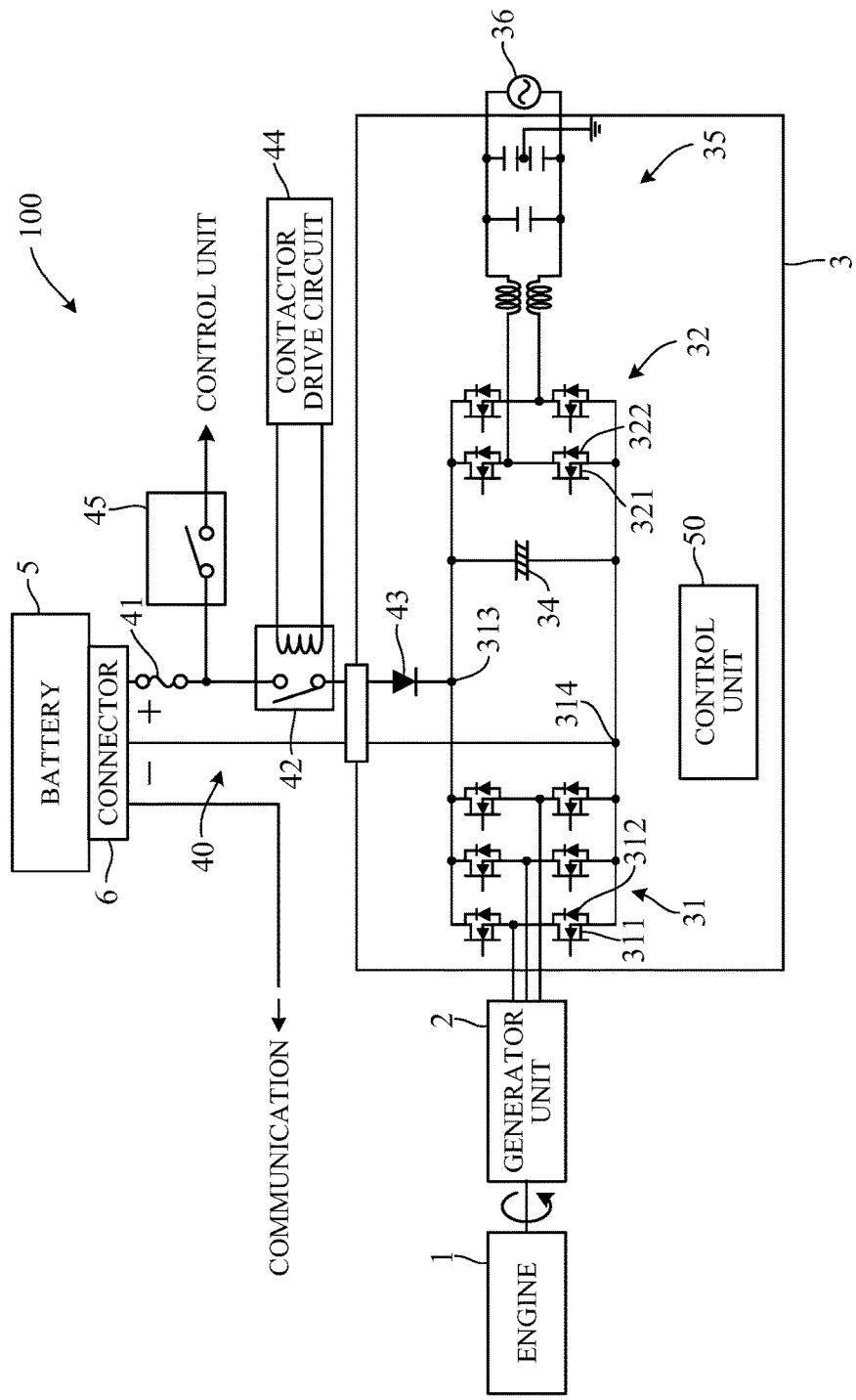
FIG. 1 is an electrical circuit diagram showing an overall configuration of an engine generator according to an embodiment of the present invention.

FIG. 1 is an electrical circuit diagram showing an overall configuration of the engine generator 100 according to the embodiment of the present invention. As shown in FIG. 1, the engine generator 100 comprises a general purpose engine 1, a generator unit 2 driven by the engine 1, and an inverter unit 3 electrically connected to the generator unit 2.

The engine 1 is, for example, a spark ignition, air cooled, gasoline fueled engine with a piston that reciprocates inside a cylinder and a crankshaft (output shaft) that rotates synchronously with the piston. Motive power of the engine 1 is output through the crankshaft to the generator unit 2. Although omitted in the drawings, the crankshaft has a recoil starter connected thereto. The recoil starter is an engine starting device used by the user to start the engine 1 manually, which starts the engine 1 by rotating its crankshaft. As explained later, speed of the engine 1 is variably controlled.

The generator unit (generator main unit) 2 is a multipolar alternator driven by the engine 1 to generate AC power. It comprises a rotor connected to and rotated integrally with the crankshaft and a stator arranged concentric with the rotor to face a peripheral surface thereof. The rotor is provided with permanent magnets. The stator is provided with UVW windings arranged at phase angle differences of 120 degree. The generator unit 2 can be driven as a starter motor by power from a battery 5, in which case the engine 1 can be started without using the recoil starter.

The inverter unit (inverter circuit) 3 comprises a power converter circuit 31 for rectifying three-phase AC current output by the generator unit 2, an inverter 32 for converting DC current output from the power converter circuit 31 to a predetermined three-phase AC current, and a control unit 50 for controlling the power converter circuit 31 and the inverter 32. The control unit 50 is constituted as a microcomputer including an arithmetic processing unit comprising a CPU, ROM, RAM and other peripheral circuits and the like.

The power converter circuit 31 is configured as a bridge circuit and comprises three pairs of (a total of six) semiconductor switching elements 311 associated one with each of the U-phase, V-phase and W-phase windings of the generator unit 2. The switching elements 311 are constituted using transistors such as MOSFETs or IGBTs, for example, and a diode (e.g., parasitic diode) 312 is connected in parallel with each switching element 311.

A gate of each switching element 311 is driven by a control signal output from the control unit 50, and ON-OFF switching of the switching elements 311 is controlled by the control unit 50. For example, when the generator unit 2 operates as a generator, the switching elements 311 are turned OFF, so that that three-phase AC is rectified by the diodes 312. The rectified current is smoothed by a capacitor 34 and sent to the inverter 32. When the generator unit 2 operates as a starter motor, the power converter circuit 31 ON-OFF controls the switching elements 311 to convert DC supplied from the battery 5 to three-phase AC for output to the generator unit 2.

The inverter 32 has two pairs of (a total of four) semiconductor switching elements 321 configured as an H-bridge circuit. The switching elements 321 are constituted using transistors such as MOSFETs or IGBTs, for example, and a diode (e.g., parasitic diode) 322 is connected in parallel with each switching element 321. A gate of the switching element 321 is driven by a control signal output from the control unit 50, ON-OFF switching of the switching elements 321 is controlled by the control unit 50, and DC current is converted to a single phase AC. The single phase AC generated by the inverter 32 is sinusoidally modulated by passage through a filter circuit 35 including reactor and capacitor and output to loads 36.

The battery 5 is electrically connected to the inverter unit 3 through a power supply circuit 40. The power supply circuit 40 is provided so as to connect the battery 5 through a connector 6 to between the power converter circuit 31 and the capacitor 34, i.e., to positive side and negative side output terminals 313 and 314 of the power converter circuit 31. More specifically, a positive side terminal of the battery 5 is connected to the positive side output terminal 313 through a fuse 41, a contactor 42 and a diode 43, and a negative side terminal thereof is connected to the minus side output terminal 314.

The contactor 42 includes a switch for electrically connecting (ON) and disconnecting (OFF) the battery 5 to and from the inverter unit 3, and its ON-OFF operation is controlled by a contactor drive circuit 44. A battery switch 45 is connected between the fuse 41 and the contactor 42, and power is supplied to the control unit 50 by turning the battery switch 45 ON. This causes the contactor drive circuit 44 to turn the contactor 42 ON. When the battery switch 45 is turned OFF, the contactor drive circuit 44 turns the contactor 42 OFF. In other words, the contactor 42 is turned ON and OFF conjointly with ON-OFF operation of the battery switch 45.

When the engine 1 is to be started by power from the battery 5, the user turns the battery switch 45 ON. This turns the contactor 42 ON, and power of the battery 5 is supplied to the power converter circuit 31. At this time, the control unit 50 determines whether the battery switch 45 is ON, and when it determines the battery switch 45 to be ON, it ON-OFF controls the switching elements 311 of the power converter circuit 31 to convert DC power to AC power. The resulting AC power is supplied to the generator unit 2, so that a revolving magnetic field is produced in a stator winding 24 (FIG. 3) and a rotor of the generator unit 2 rotates. As a result, a crankshaft 11 is rotated and the engine 1 can be started by cranking. A communication line is connected to the connector 6, and internal temperature, charge state and other battery 5 data are transmitted through this communication line to the control unit 50.

Figure 2A:
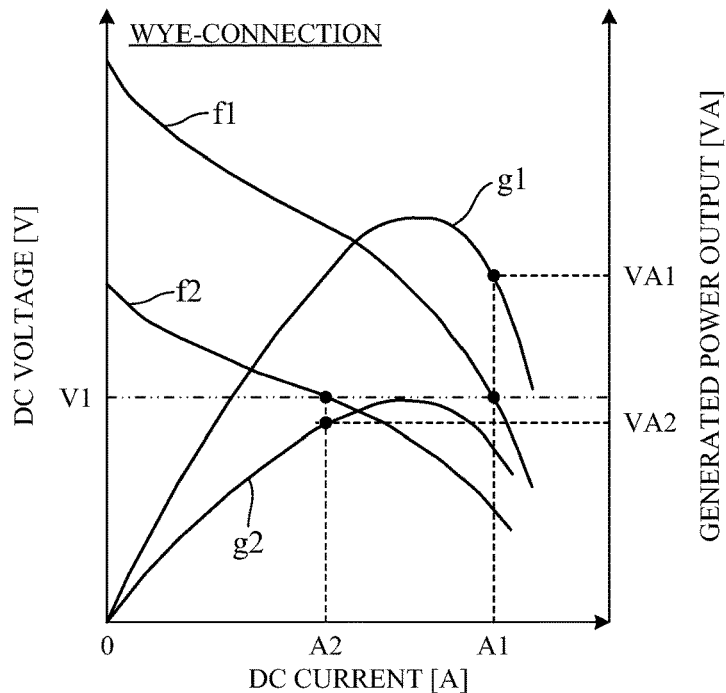
FIG. 2A is a diagram showing general characteristics of a generator unit of FIG. 1 when a winding is arranged in wye-connection configuration.
Figure 2B:
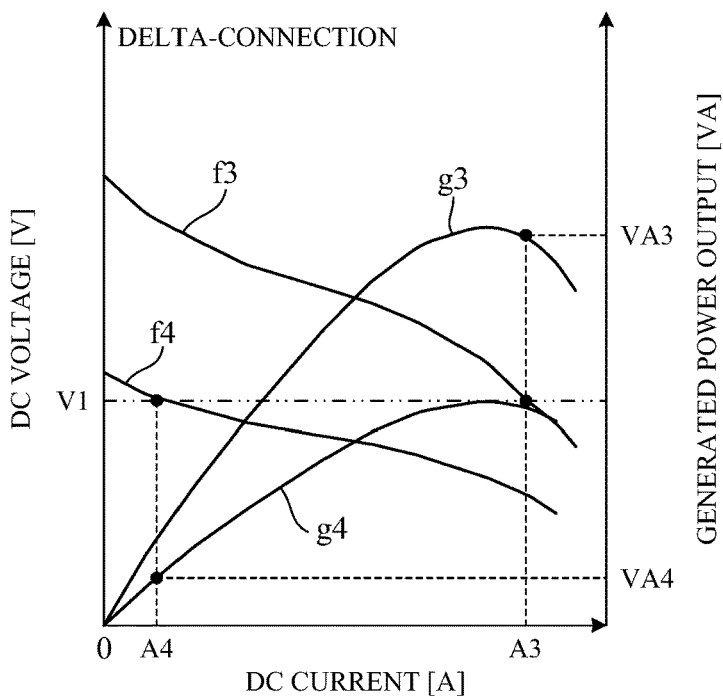
FIG. 2B is a diagram showing general characteristics of a generator unit of FIG. 1 when a winding is arranged in delta-connection configuration.

Wye-connection and delta-connection are available as connection configurations of the three-phase stator winding of the generator unit 2. FIGS. 2A and 2B are diagrams showing general characteristics of the generator unit 2 functioning as a generator when the stator winding 24 is arranged in wye-connection configuration and in delta-connection configuration, respectively. Characteristic curves f1 and f2 in FIG. 2A and characteristic curves f3 and f4 in FIG. 2B respectively represent DC current (A) vs DC voltage (V) characteristics after rectification by the power converter circuit 31, and characteristic curves g1 and g2 in FIG. 2A and characteristic curves g3 and g4 in FIG. 2B respectively represent DC current vs generated power output after rectification by the power converter circuit 31. Among these, curves f1, g1, f3 and g3 represent characteristics at a predetermined engine speed N2 (e.g., 5,000 rpm), and curves f2, g2, f4 and g4 represent characteristics at a predetermined engine speed N1 lower than engine speed N2 (e.g., 3,000 rpm). Power output (VA) is equal to the product of DC current (A) and DC voltage (V).

As can be seen in FIGS. 2A and 2B, in both wye-connection and delta-connection, DC voltage decreases with increasing DC current (characteristic curves f1 to f4). However, maximum DC voltage when DC current is 0, and right-downward slope of curves f1 to f4 differ between wye-connection and delta-connection, namely, become high-voltage, low-current characteristic curves f1 and f2 in wye-connection and low-voltage, high-current characteristic curves f3 and f4 in delta-connection. Therefore, power output becomes maximum (peak value) further to lower current side in wye-connection than in delta-connection (curves g1 to g4).

In FIGS. 2A and 2B, symbol V1 indicates DC voltage corresponding to rated AC voltage of the generator 100 (e.g., 100V). As shown in FIG. 2A, when the winding is wye-connected, DC current corresponding to predetermined voltage V1 is A1 and generated power output is VA1 when engine speed is predetermined engine speed N2. On the other hand, DC current corresponding to predetermined voltage V1 is A2 and generated power output is VA2 when engine speed is predetermined engine speed N1.

As shown in FIG. 2B, when the winding is delta-connected, DC current corresponding to predetermined voltage V1 is A3 and generated power output is VA3 when engine speed is predetermined engine speed N2. On the other hand, DC current corresponding to predetermined voltage V1 is A4 and generated power output is VA4 when engine speed is predetermined engine speed N1.

Thus, in wye-connection, relatively high power output is obtained at low engine speed (characteristic curve g2), and when engine speed becomes high, power output peaks and then declines (characteristic curve g1). In contrast, in delta-connection, relatively high power output is obtained at high engine speed (characteristic curve g3), but power output falls when engine speed becomes low (characteristic curve g4). Exploiting the fact that generated power output characteristics differ depending on engine speed and winding connection configuration in this way, the engine-generator 100 of the present embodiment is configured as set out below.

Figure 3:
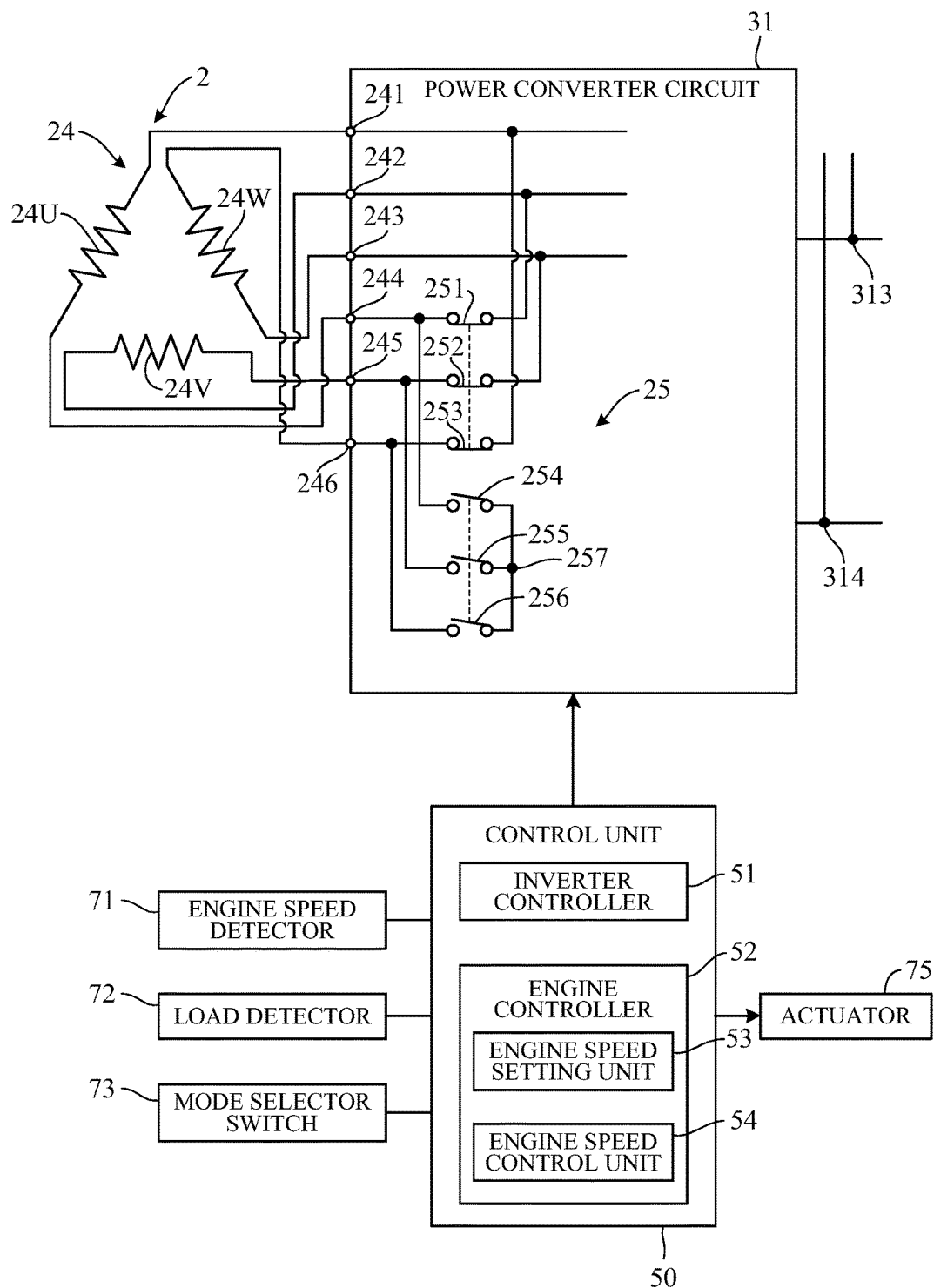
FIG. 3 is an electrical circuit diagram showing essential components of the engine generator according to the embodiment of the present invention.

FIG. 3 is an electrical circuit diagram showing essential components of the engine-generator 100 according to an embodiment of the present invention. As shown in FIG. 3, the stator winding 24 of the generator unit 2 includes a U-phase winding 24U, a V-phase winding 24V and a W-phase winding 24W. One end terminals (first terminal to third terminal) 241 to 243 of the windings 24U, 24V and 24W are connected to the switching elements 311 and the diodes 312 of the power converter circuit 31 of FIG. 1. Other end terminals (fourth terminal to sixth terminal) 244 to 246 of the windings 24U, 24V and 24W are connected to a switching circuit 25.

The switching circuit 25 is provided between the generator unit 2 and the power converter circuit 31 and is implemented on the inverter unit 3. More specifically, the switching circuit 25 comprises a switch (first switch) 251 whose one end is connected to the terminal 244 and other end is connected to the terminal 242, a switch (second switch) 252 whose one end is connected to the terminal 245 and other end is connected to the terminal 243, a switch (third switch) 253 whose one end is connected to the terminal 246 and other end is connected to the terminal 241, and switches (fourth switch to sixth switch) 254 to 256 whose one ends are connected to the terminals 244 to 246, respectively, and other ends are connected together through a neutral point 257. The switches 251 to 256 are, for example, constituted as relay switches that are opened and closed (turned ON and OFF) by energizing and de-energizing coils.

The switches 251 to 256 are opened and closed, i.e., their coils are energized and de-energized, by control signals from the control unit 50. Where the switches 251 to 253 are defined as a first switch group and the switches 254 to 256 as a second switch group, the control unit 50 outputs control signals to simultaneously turn ON the switches 251 to 253 of the first switch group and simultaneously turn OFF the switches 254 to 256 of the second switch group, or to simultaneously turn OFF the switches 251 to 253 of the first switch group and simultaneously turn ON the switches 254 to 256 of the second switch group.

When the first switch group switches 251 to 253 turn OFF and the second switch group switches 254 to 256 turn ON, the connection configuration of the winding 24 switches to wye-connection. When the first switch group switches 251 to 253 turn ON and the second switch group switches 254 to 256 turn OFF, the connection configuration of the winding 24 switches to delta-connection.

An engine speed detector 71 for detecting engine speed, a load detector 72 for detecting size of the load 36, i.e., load value (power consumption), connected to the generator 100, and a mode selector switch 73 are connected to the control unit 50.

The engine speed detector 71 is constituted as an electromagnetic pick-up type, optical type, or other type crank-angle sensor. The load detector 72 is provided in the inverter unit 3 as, for example, a current sensor for detecting current through the load (load current) or as a voltage sensor for detecting applied voltage. The control unit 50 detects load value by performing calculations using the detection values of these sensors.

The mode selector switch 73 is a switch operated by the user that enables selection between normal operating mode and economical operating mode. In normal operating mode, desired engine speed is set to a specified engine speed, while in economical operating mode, desired engine speed is increased/decreased within a predetermined engine speed range in response to load fluctuation.

The control unit 50 comprises an inverter controller 51 and an engine controller 52 as functional constituents. Optionally, the engine controller 52 can be provided as a control unit separate from the control unit 50. The inverter controller 51 controls operation of the contactor drive circuit 44, ON-OFF operation of the switching elements 311 of the power converter circuit 31 and of the switching elements 321 of the inverter 32, and operation (switching) of the switches 251 to 256 of the switching circuit 25.

The engine controller 52 comprises an engine speed setting unit 53 for setting desired engine speed of the engine 1 and an engine speed control unit 54 for controlling engine speed to desired engine speed. While monitoring output value of the engine speed detector 71, the engine speed control unit 54 outputs control signals to a motor or other actuator 75 for adjusting throttle valve opening, thereby controlling (e.g., PID controlling) engine speed to desired engine speed. Switching of winding connection configuration by the inverter controller 51 and setting of desired engine speed by the engine speed setting unit 53 are performed, for example, as set out in the following.

Figure 4:
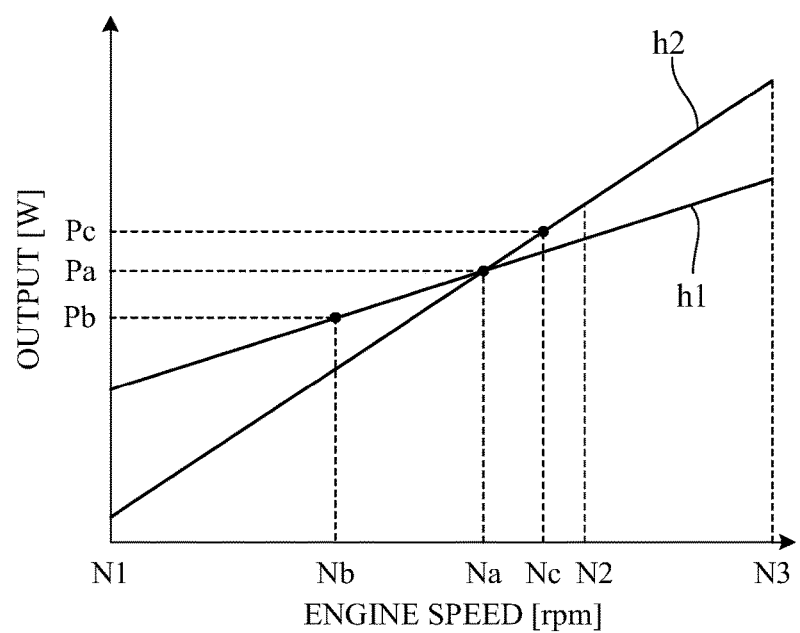
FIG. 4 is a diagram showing relationship between an engine speed and an engine output generated by the engine generator according to the embodiment of the present invention.

FIG. 4 is a characteristic diagram showing how output (W) generated by the engine-generator 100 varies as a function of engine speed N in the generator 100 in accordance with an embodiment of the present invention, and the corresponding characteristics are stored in a memory of the control unit 50 beforehand. Characteristic curves h1 and h2 seen in FIG. 4 represent intrinsic characteristics of the generator 100 at the time of wye-connection and delta-connection, respectively. The characteristic curves h1 and h2 are shown simplified as straight lines in FIG. 4. Symbols N1 and N2 in the diagram correspond to the aforesaid engine speeds (to the same symbols used in the explanation of FIGS. 2A and 2B). So N1 means engine speed of, say, 3,000 rpm, and N2 means engine speed of, say, 5,000 rpm.

As shown in FIG. 4, in both wye-connection and delta-connection, output increases with increasing engine speed in a range between predetermined engine speed N1 and predetermined engine speed N3 (>N2). N1 and N3, for example, define an engine speed range during economical operating mode and in this economical operating mode, engine speed N can be varied within the range of N1≤N≤N3. N2, for example, corresponds to desired engine speed in normal operating mode.

At engine speed N1, output by wye-connection (curve h1) is greater than that by delta-connection (curve h2), but slope (output increase rate) of curve h2 is steeper than that of curve h1, and the two curves intersect at engine speed Na. So, with engine speed Na as an inversion point, output by wye-connection is greater on the lower engine speed side and output by delta-connection is greater on higher engine speed side. Desired engine speed N2 in normal operating mode is set to a value greater than Na. In the case of FIG. 4, output value is Pa at engine speed Na. In the present embodiment, this output value Pa is defined as a threshold (predetermined value) for switching between wye-connection and delta connection in economical operating mode.

When load value detected by the load detector 72, i.e., desired output, is predetermined value Pa or less (is Pb, for example), the inverter controller 51 switches the winding connection configuration to wye-connection capable of exhibiting greater output than that by delta-connection. At this time, the engine speed setting unit 53 sets desired engine speed (e.g., Nb) based on characteristic curve h1. In contrast, when desired output exceeds predetermined value Pa (is Pc, for example), the inverter controller 51 switches the winding connection configuration to delta-connection capable of exhibiting greater output than that by wye-connection. At this time, the engine speed setting unit 53 sets desired engine speed (e.g., Nc) based on characteristic curve h2.

Figure 5:
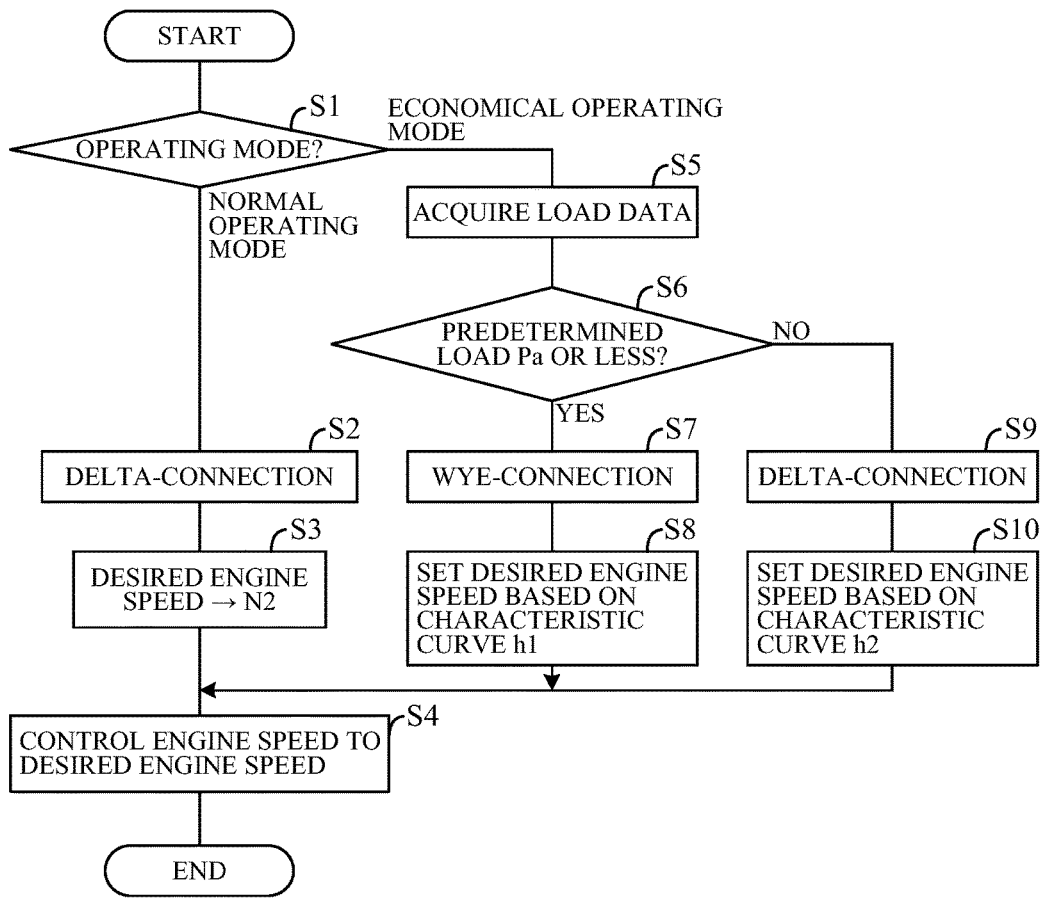
FIG. 5 is a flowchart showing an example of processing performed by the control unit of FIG. 3.

FIG. 5 is a flowchart showing an example of processing performed by the control unit 50. The processing indicated by this flowchart is started, for example, when the generator unit 2 generates power after engine starting. First, in S1 (S: processing Step), selected operating mode is determined from a signal read from the mode selector switch 73.

When selected operating mode is determined to be normal operating mode in S1, the program goes to S2. In S2, the inverter controller 51 performs processing by which a control signal is output to the switching circuit 25 to establish delta-connection as the connection configuration. Next, in S3, the engine speed setting unit 53 performs processing by which predetermined engine speed N2 is set as desired engine speed. Further, in S4, the engine speed control unit 54 performs processing by which a control signal is output to the actuator 75 to control engine speed to desired engine speed.

On the other hand, when selected operating mode determined in S1 is economical operating mode, the program goes to S5. In S5, load data are acquired from the load detector 72. Next, in S6, whether load value (desired output) is predetermined value Pa or less is determined. When the result in S6 is YES, the program goes to S7, in which the inverter controller 51 performs processing by which a control signal is output to the switching circuit 25 to establish wye-connection as the connection configuration. Next, in S8, the engine speed setting unit 53 performs processing by which desired engine speed is set based on characteristic curve h1 of FIG. 4. Next, the program goes to S4, in which engine speed is controlled to the desired engine speed set in S8.

When load value determined in S6 exceeds predetermined value Pa, the result in S6 is NO, and the program goes to S9. In S9, the inverter controller 51 performs processing by which a control signal is output to the switching circuit 25 to establish delta-connection as the connection configuration. Next, in S10, the engine speed setting unit 53 performs processing by which desired engine speed is set based on characteristic curve h2 of FIG. 4. Next, the program goes to S4, in which engine speed is controlled to the desired engine speed set in S10.

The present embodiment can achieve advantages and effects such as the following.

(1) The engine-generator 100 according to the present embodiment includes the variable speed control capable general purpose engine 1, the generator unit 2 having the three-phase winding 24 and driven by the engine 1 to generate electric power, the inverter unit 3 that converts AC current output from the generator unit 2 to AC current of predetermined frequency for output to the load 36, the switching circuit 25 that switches connection configuration of the winding 24 to one or the other of wye-connection and delta-connection, the load detector 72 that detects load size, and the inverter controller 51 that controls operation of the switching circuit 25 so as to switch connection configuration to wye-connection when load size detected by the load detector 72 is predetermined value Pa or less and switch connection configuration to delta-connection when detected load size exceeds predetermined value Pa (FIGS. 1 and 3).

The switching of connection configuration between wye-connection and delta-connection in response to load size in this manner enables the load 36 to obtain adequate output from the generator 100 over a wide range of engine speeds. For example, as shown in FIGS. 2A and 2B, generated power output is VA2 when engine speed is N1 and generated power output is VA3 when engine speed is N2 (>N1), and the load can obtain adequate output at either engine speed N1 or engine speed N2. The generator unit 2 can therefore be built at low cost because it does not need to be enlarged or a permanent magnet of its rotor to be upgraded.

(2) The engine-generator 100 further includes the mode selector switch 73 for selecting one or the other of normal operating mode and economical operating mode as operating mode, the engine speed setting unit 53 for setting desired engine speed in response to operating mode selected by the mode selector switch 73, and the engine speed control unit 54 for controlling engine speed to desired engine speed set by the engine speed setting unit 53. When normal operating mode is selected by the mode selector switch 73, the engine speed setting unit 53 sets predetermined desired engine speed N2 irrespective of load size detected by the load detector 72, and when economical operating mode is selected by the mode selector switch 73, the engine speed setting unit 53 sets desired engine speed within a predetermined engine range (N1≤N≤N3) in accordance with load size detected by the load detector 72 (S3, S8, S10). Since engine speed can therefore be increased/decreased in accordance with load size, efficient operation of the engine 1 can be realized.

(3) In this case, when economical operating mode is selected and load size detected by the load detector 72 is predetermined value Pa or less (is Pb in FIG. 4, for example), the engine speed setting unit 53 sets desired engine speed to a speed based on characteristic curve h1 representing predefined relation between engine speed and load (output) when connection configuration of the winding 24 is wye-connection (to engine speed Nb in FIG. 4, for example) (S8). Further, when economical operating mode is selected and load size detected by the load detector 72 exceeds predetermined value Pa (is Pc in FIG. 4, for example), the engine speed setting unit 53 sets desired engine speed to a speed based on characteristic curve h2 representing predefined relation between engine speed and load (output) when connection configuration of the winding 24 is delta-connection (to engine speed Nc in FIG. 4, for example). This makes it possible to set an optimum engine speed in view of load size and winding connection configuration.

In the aforesaid embodiment, connection configuration is switched in accordance with load size, but since engine speed and load size are correlated (FIG. 4), connection configuration can instead be switched in accordance with engine speed. In other words, an alternative configuration can be adopted wherein the engine-generator 100 has the variable speed control capable general purpose engine 1 and the three-phase winding 24 and comprises the generator unit 2 driven by the engine 1 to generate electric power, the inverter unit 3 that converts AC current output from the generator unit 2 to AC current of predetermined frequency for output to the load 36, the switching circuit 25 that switches connection configuration of the winding 24 to one or the other of wye-connection and delta-connection, the engine speed detector 71 that detects engine speed of the engine 1, and the inverter controller 51 that controls operation of the switching circuit 25, and wherein the inverter controller 51 is adapted to switch connection configuration to wye-connection when engine speed detected by the engine speed detector 71 is a predetermined engine speed (e.g., Na in FIG. 4) or less and to switch connection configuration to delta-connection when detected engine speed exceeds the predetermined engine speed.

In the aforesaid embodiment, the mode selector switch 73 is provided for switching operating mode to one or the other of normal operating mode (first mode) and economical operating mode (second mode), but a mode selection unit is not limited to this arrangement. Alternatively, the mode selection unit can be omitted and engine speed be changed simply by operation of a selector switch. For example, an arrangement can be adopted whereby engine speed is controlled to a predetermined first engine speed when a selector switch is placed in a first position and is controlled to a predetermined second engine speed when the selector switch is placed in a second position. Optionally in this case, an arrangement can be adopted wherein the first engine speed is set to a value greater than Na in FIG. 4 and the second engine speed is set to a value smaller than Na, and connection configuration is switched to delta-connection when the selector switch is placed in first position and to wye-connection when the selector switch is placed second position.

In the aforesaid embodiment, the engine speed setting unit 53 sets predetermined desired engine speed N2 (first desired engine speed) irrespective of detected load when normal operating mode is selected and sets desired engine speed Nb, Nc or the like (second desired engine speed) in accordance with detected load when economical operating mode is selected. More specifically, an arrangement is adopted wherein, in economical operating mode selected state, when detected load size is predetermined value Pa or less, desired engine speed is set based on characteristic curve h1 (first characteristic) predefined for wye-connection, and when detected load size exceeds predetermined value Pa, desired engine speed is set based on characteristic curve h2 (second characteristic) predefined for delta-connection, but the engine speed setting unit is not limited to this configuration. For example, instead of using a map, desired engine speed corresponding to load can be set by performing a predetermined calculation.

In the aforesaid embodiment, load size is detected based on a signal from the current sensor or other type load detector 72, but a load detection unit is not limited to this configuration. In the aforesaid embodiment, connection configuration of the winding 24 is switched to one or the other of wye-connection and delta-connection by ON-OFF operation of the switches 251 to 256 of the switching circuit 25, but a connection switching unit and a connection switching control unit are not limited to this configuration. Namely, the configuration of the switching circuit 25 serving as the connection switching unit and the processing performed in the inverter controller 51 serving to control connection switching can be of any arrangement insofar as capable of switching connection configuration to wye-connection when load size detected by the load detection unit is a predetermined value or less and switching to delta-connection when detected load size exceeds the predetermined value.

The above embodiment can be combined as desired with one or more of the above modifications. The modifications can also be combined with one another.

According to the present invention, since winding connection configuration is appropriately switched in accordance with load size, adequate output can be obtained from the engine-generator over a wide range of engine speeds.

Above, while the present invention has been described with reference to the preferred embodiments thereof, it will be understood, by those skilled in the art, that various changes and modifications may be made thereto without departing from the scope of the appended claims.

What is claimed is:

1. An engine generator, comprising:
a general purpose engine, an engine speed of the engine being configured to be variably controlled;
a generator unit having a three-phase winding and configured to be driven by the engine to generate power;
an inverter unit configured to convert alternating current output from the generator unit to alternating current of a predetermined frequency to output to a load;
a connection switching unit configured to switch a connection configuration of the winding to one of a wye-connection and a delta-connection;
a load detection unit configured to detect a power consumption of the load; and
a connection switching control unit configured to control the connection switching unit to switch the connection configuration to the wye-connection when the power consumption of the load detected by the load detection unit is equal to or lower than a predetermined value, and to switch the connection configuration to the delta-connection when the power consumption of the load detected by the load detection unit is higher than the predetermined value.

2. The engine generator according to claim 1, further comprising:
a mode selection unit configured to select an operating mode from a first mode and a second mode;
an engine speed setting unit configured to set a desired engine speed in response to the operating mode selected by the mode selection unit; and
an engine speed control unit configured to control the engine speed to the desired engine speed set by the engine speed setting unit, wherein
the engine speed setting unit is further configured to set a predetermined first desired engine speed irrespective of the power consumption of the load detected by the load detection unit when the first mode is selected by the mode selection unit, and to set a second desired engine speed in accordance with the power consumption of the load detected by the load detection unit when the second mode is selected by the mode selection unit.

3. The engine generator according to claim 2, wherein
the engine speed setting unit is further configured to, when the second mode is selected by the mode selection unit and the power consumption of the load detected by the load detection unit is equal to or lower than the predetermined value, set the second desired engine speed based on a first characteristic representing a predefined relation between the engine speed and the load when the connection configuration of the winding is the wye-connection and further configured to, when the second mode is selected by the mode selection unit and the power consumption of the load detected by the load detection unit is higher than the predetermined value, set the second desired engine speed based on a second characteristic representing a predefined relation between the engine speed and the load when the connection configuration of the winding is the delta-connection.

4. The engine generator according to claim 3, wherein
the first characteristic is a characteristic curve in which the load increases with increase of the engine speed at a first increasing rate, the second characteristic is a characteristic curve in which the load increases with increase of the engine speed at a second increasing rate higher than the first increasing rate, and the first characteristic and the second characteristic intersect when the power consumption of the load is the predetermined value.

5. The engine generator according to claim 1, further comprising:

a power converter circuit configured to rectify three-phase alternating current output from the generator unit, wherein the connection switching unit is constituted of a switching circuit provided between the generator unit and the power converter circuit.

6. The engine generator according to claim 5, wherein the three-phase winding has a first winding, a second winding and a third winding, one end of each of the first winding, the second winding and the third winding being connected to the power converter circuit through each of a first terminal, a second terminal and a third terminal, an other end of each of the first winding, the second winding and the third winding being connected to the switching circuit through each of a fourth terminal, a fifth terminal and a sixth terminal, and the switching circuit has a first switch, a second switch, a third switch, a fourth switch, a fifth switch, and a sixth switch, one end of the first switch being connected to the fourth terminal, an other end of the first switch being connected to the second terminal, one end of the second switch being connected to the fifth terminal, an other end of the second switch being connected to the third terminal, one end of the third switch being connected to the sixth terminal, an other end of the third switch being connected to the first terminal, one end of each of the fourth switch, the fifth switch and the sixth switch being connected to each of the fourth terminal, the fifth terminal and the sixth terminal, an other end of each of the fourth switch, the fifth switch and the sixth switch being connected to each other through a neutral point.

7. An engine generator, comprising:

a general purpose engine, an engine speed of the engine being configured to be variably controlled;

a generator unit having a three-phase winding and configured to be driven by the engine to generate power;

an inverter unit configured to convert alternating current output from the generator unit to alternating current of a predetermined frequency to output to a load;

a connection switching unit configured to switch a connection configuration of the winding to one of a wye-connection and a delta-connection;

a load detection unit configured to detect a power consumption of the load; and a CPU and a memory coupled to the CPU, wherein the CPU and the memory are configured to perform controlling the connection switching unit to switch the connection configuration to the wye-connection when the power consumption of the load detected by the load detection unit is equal to or lower than a predetermined value, and to switch the connection configuration to the delta-connection when the power consumption of the load detected by the load detection unit is higher than the predetermined value.

\* \* \* \* \*